Sept. 4, 1962 R. A. STEWART ETAL 3,052,555
METHOD OF PREPARING CANNED INFANT MILK FORMULA
Filed Dec. 31, 1958
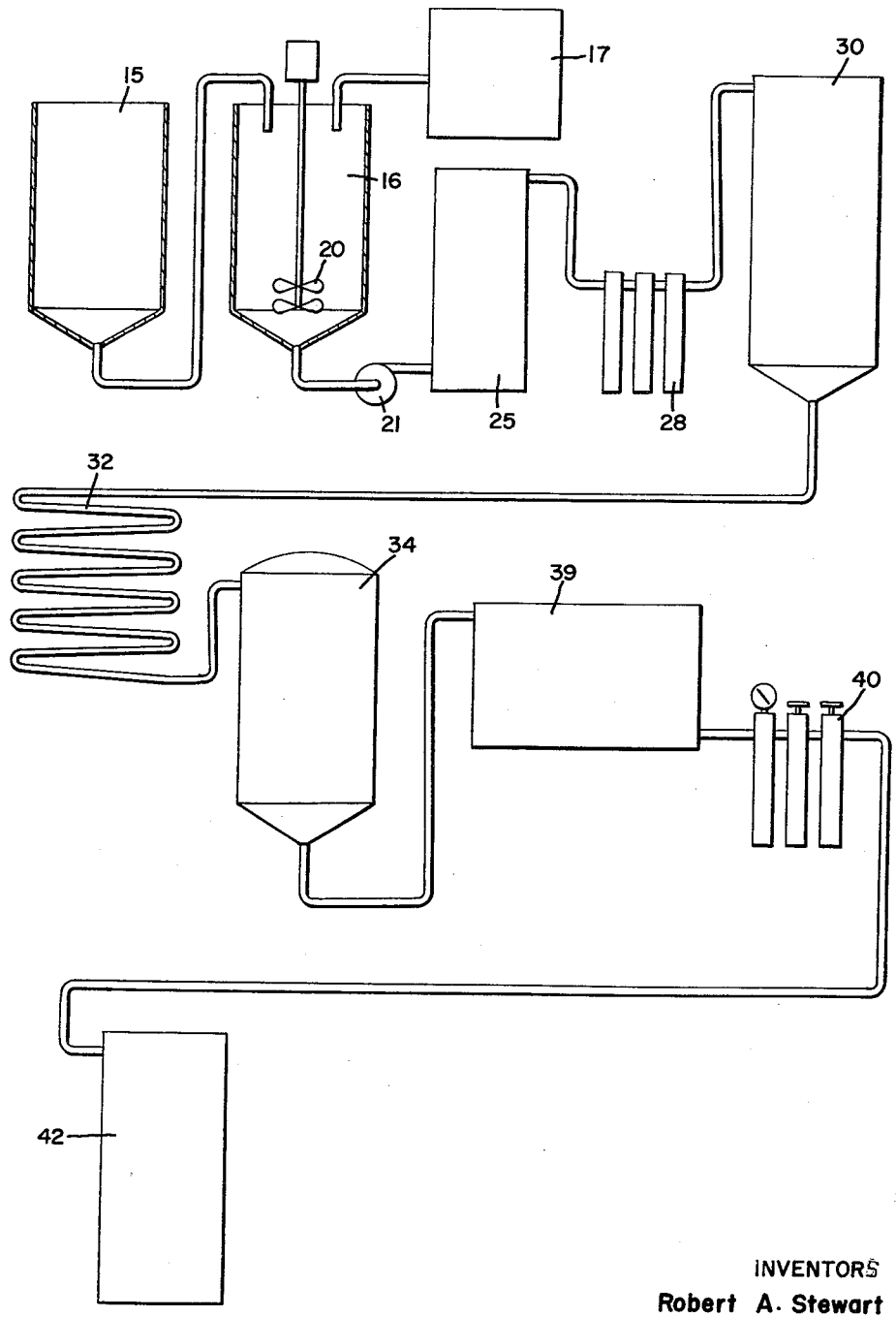
INVENTORS
Robert A. Stewart
William A Rock
BY Townsend and Townsend
attorneys 3,052,555
METHOD OF PREPARING CANNED INFANT MILK FORMULA
Robert A. Stewart, San Lorenzo, and William A. Rock, Castro Valley, Calif., assignors to Gerber Products Company, Fremont, Mich., a corporation of Michigan
Filed Dec. 31, 1958, Ser. No. 784,313
5 Claims. (Cl. 99—183)

This invention relates to a method for preparing a sterile canned infant milk product.

One of the common procedures for preparing condensed canned milk is to hermetically seal milk in cans and thereafter heat the can in order to effect the requisite sterilization of the product. Another method of canned milk comprises the steps of treating the milk in sealed aseptic lines and metering the milk to sterilized cans or jars under aseptic conditions so that there is no need of further treatment of the hermetically sealed cans or jars subsequent to their being filled and sealed.

It has been found, however, that milk products suitable for infant formulation that may be stable when treated in the can are unstable when treated by the aseptic canning procedures. Thus such milk products treated in aseptic lines tend to coagulate or form a semi-solid jell phase form which is called age thickening.

The principal object of this invention is to provide an age-stable infant canned milk product produced by aseptic canning procedures by the novel process of removing the fat content from the milk, evaporating a controlled amount of water from the milk and thence heat treating the milk within a relatively low controlled temperature range for a predetermined time interval to denature the milk (protein components) so as to prevent subsequent age thickening of the completed product.

A feature and advantage of the heat treating process is that subsequent to the heat treatment of the milk fat, carbohydrate and stabilizers are added to the milk to form a product having the requisite nutritional content for infant feeding and the product may be sterilized and homogenized prior to being canned without creating an unstable formula which is likely to age thicken.

A further object of this invention is to provide a process including low heat treatment of condensed skim milk subsequent to the addition of nutritional additives and sterilizing of the milk in which the final produce is both resistant to age thickening and is relatively free of the cooked taste frequently associated with canned milk. The low heat treatment more specifically is within the range or area of a high of below 170° F. for a period of five minutes and a low of 150° F. for 45 minutes. It is believed that higher temperature over the 170° F. will cause a cooked flavor to be imparted into the milk product.

Other objects of the present invention will become apparent upon reading the following specification and referring to the accompanying drawing.

The drawing is a schematic view showing an apparatus for practicing the process of this invention.

In the practice of this invention cow's milk is first processed in order to remove substantially all the fat content and the milk is placed in an evaporator wherein the liquid content of the skim milk is evaporated to a concentration of between 27% to 37% milk solids. It is convenient for purposes of standardization to use skim milk with a 32% solid concentration as such is commercially available.

The concentrated skim milk is then heated under normal atmospheric pressure to a range no greater than 170° F. for a period of five minutes and preferably no less than 150° F. for forty-five minutes.

It has been found that for a skim milk concentration of 32% solids that the heating of the milk to a temperature of 162° F. for a period of 20 minutes gives excellent results.

The heat treated milk is then rapidly cooled for storage unless further processing can be immediately accomplished in which case the cooling step can be eliminated.

The milk is then treated to provide an infant feeding formula by adding various nutritional and stabilizing ingredients. These ingredients are blended with the milk to increase the carbohydrate, vitamin, calcium and fat contents of the milk.

It is important in the practice of this invention that the heat treatment completely occurs prior to the mixing or blending of the nutritional and stabilizing ingredients.

The milk is then fed into aseptic lines where it is subjected to controlled temperatures for controlled periods of time and at controlled pressures to sterilize and homogenize the milk. Thereafter the milk is metered into cans and sealed to sterile conditions. The final canned product is then ready for shipment or use without further processing.

The milk is processed under sterile conditions in a mechanism schematically shown in FIG. 1 and described by way of example in U.S. Patent No. 2,855,314 to Martin, issued October 7, 1958, and U.S. Patent No. 2,549,216, issued April 17, 1951.

In FIG. 1 a heating tank is shown at 15 into which the 32% solid concentrate cow's milk having substantially all the fat content removed therefrom is heated for the requisite period of time preferably for approximately 160° F. for 20 minutes. The milk is then either cooled and stored or immediately transferred to mixing tank 16 where the mixture is continuously agitated by agitators 20. Various nutritive and/or stabilizing ingredients commercially used in the art are blended with the milk from a discharge tank 17.

The blended formula is then forced by a pump to a plate-type heat exchanger 25 which rapidly raises the temperature of the blended milk to 220° F. The milk is forced by a positive displacement type pump 28 to a steam injection heater 30 where the temperature is very rapidly raised to 273° F. and allowed to remain at this temperature for 32 seconds. This creates a temperature time ratio of sterilization value of $F_0=10$. Sterilization values of at least 10 are preferable where the milk is to be used for infant feeding in order to add a sufficient safety factor to the product.

The product is then fed to a cooler mechanism 32 and rapidly cooled to 213° F. Thereafter the milk is allowed to enter a closed, vented vessel 34 under slight positive pressure through a small orifice where flashing-off of the occluded and dissolved air and water is accomplished.

The product is then cooled further in a heat exchanger 39 to 190° F. and then enters a two stage sterile homogenizer 40 where it is first subjected to temperature between 180° and 200° F. at a pressure of 3,000 lbs. per square inch and thereafter in the second stage treated under 500 pounds per square inch pressure. The product is then fed to a canning apparatus 42 where the product is reduced in temperature to 90° F. and then filled into pre-sterilized containers in aseptic canning equipment, hermetically sealed, labeled and prepared for shipping.

It is extremely important that all phases of the aseptic processing from the sterilizer 30 thereafter until the milk is hermetically sealed in the cans should be accomplished under completely sterile conditions.

The final product exhibits excellent stability toward age thickening or storage and is free of the cooked milk flavor conventionally associated with canned milk products. The nutritional content of the milk allows the milk to be diluted in a 1 to 1 ratio for feeding to infants and provides a balanced non-allergic premixed formulation for infant feeding.

While the invention has been described for purposes of understanding by reference to illustrations and examples it is to be understood that various modifications in the process and practice thereof may be desirable. Therefore this application contemplates all modifications within the scope of the appended claims.

What is claimed is:

1. In the method of preparing age stable homogeneous sterile infant formula adapted for long period storage in hermetically sealed containers without age thickening by aseptic canning procedures, the improvement comprising heating concentrated skim milk, at normal atmospheric pressure, to a temperature range within 150° F. for 45 minutes to 170° F. for 5 minutes and then homogenizing, sterilizing and adding nutritional and stabilizing additives.

2. In the method of preparing age stable homogeneous sterile infant formula adapted for storage in hermetically sealed containers for a prolonged period of time by aseptic canning procedures, including the steps of: removing substantially all the fat from the milk; evaporating the milk to within 27% to 37% solids; heating the concentrated milk the improvement which comprises executing said heating step, at normal atmospheric pressure, within the range of 150° F. for 45 minutes to 170° F. for 5 minutes prior to adding any ingredients to the milk and the homogenization and sterilization thereof.

3. A process according to claim 2 and wherein the milk is concentrated to a solids concentration of 32% and the milk is heated to a temperature of substantially 162° F. for approximately 20 minutes.

4. A method of preparing a sterile homogeneous age stable canned infant milk formula by aseptic canning procedures comprising the steps of: removing substantially all the fat from the milk; evaporating the milk to within 27% and 37% solids; heating the concentrated milk, at normal atmospheric pressure, to between 150° F. to 170° F. for a period of 45 to 5 minutes; adding nutritional additives to the concentrated milk; adding stabilizing ingredients to the concentrated milk; sterilizing the concentrated milk product; homogenizing the concentrated milk product; metering said product to containers; and hermetically sealing said containers; said sterilizing, homogenizing, metering and sealing steps being under sterile conditions.

5. A method of preparing a sterile infant milk formula by aseptic canning procedures and whose product is adaptable for storage in hermetically sealed containers and characterized as being a homogeneous liquid highly resistant to age thickening comprising the steps of: removing substantially all fat content from the milk; evaporating the milk to approximately 32% solid content; heating the concentrated milk, at normal atmospheric pressure, to approximately 162° F. for 20 minutes; adding an oil, a preservative and a carbohydrate to the concentrated milk; sealing the concentrated milk product in a sterilized aseptic line; sterilizing the product at a sterilization value of at least $F_0=10$; rapidly cooling said concentrated milk product to below 190° F.; homogenizing said milk in a two stage homogenizer and metering the milk product to individual sterile containers and hermetically sealing each of the containers under sterile conditions.

References Cited in the file of this patent

UNITED STATES PATENTS

| | | |
|---|---|---|
| 2,650,879 | Peebles et al. | Sept. 1, 1953 |
| 2,657,142 | Peebles | Oct. 27, 1953 |

OTHER REFERENCES

Hunziker: "Condensed Milk and Milk Powder," 7th Ed., pub. by the Author, La Grange, Ill. (1949), pp. 243, 246, 264, 268 to 269, 284, 300 and 306.